Jan. 3, 1933.  E. M. HIRSH ET AL  1,893,413
APPARATUS FOR TRANSMITTING POWER
Filed April 15, 1931

Inventors:
Edgar M. Hirsh and
Jerome H. D'Ardelet
by Raymond Jones
their Atty.

Patented Jan. 3, 1933

1,893,413

UNITED STATES PATENT OFFICE

EDGAR M. HIRSH AND JEROME H. D'ANDELET, OF SILVER SPRING, MARYLAND

APPARATUS FOR TRANSMITTING POWER

Application filed April 15, 1931. Serial No. 530,391.

Our invention relates to apparatus for transmitting power, and it has particular relation to apparatus whereby power may be transmitted to a rotating shaft either through a direct drive or through an overrunning clutch.

Our invention is particularly adapted for utilization in vehicles wherein a source of power drives the vehicle through a rotating shaft. In such vehicles, it is desirable to provide a device for automatically disconnecting the source of power from the shaft when the shaft tends to return power to the source, and to associate with the device means operable at will to prevent the disconnection. Devices heretofore proposed for this purpose have materially added to the parts required and have complicated the assembly of the machine.

It is accordingly an object of our invention to provide an improved apparatus for permitting a driven shaft to automatically overrun a driving shaft.

It is another object of our invention to provide a universal coupling having parts relatively movable for actuating an associated clutch device.

It is another object of our invention to provide an improved device for optionally providing either fixed or overrunning drive.

It is another object of our invention to provide an overrunning drive for a vehicle which adds a minimum of parts to the vehicle.

It is another object of our invention to provide an apparatus wherein an overrunning clutch device is combined with a universal coupling.

It is a further and more specific object of our invention to provide an apparatus wherein a device for optionally providing either fixed or overrunning drive is combined with a universal coupling having parts relatively movable to permit selection of either fixed or overrunning drive.

Other objects of our invention will be apparent from the following detailed description, taken in conjunction with the accompanying drawing, in which—

Figure 1:
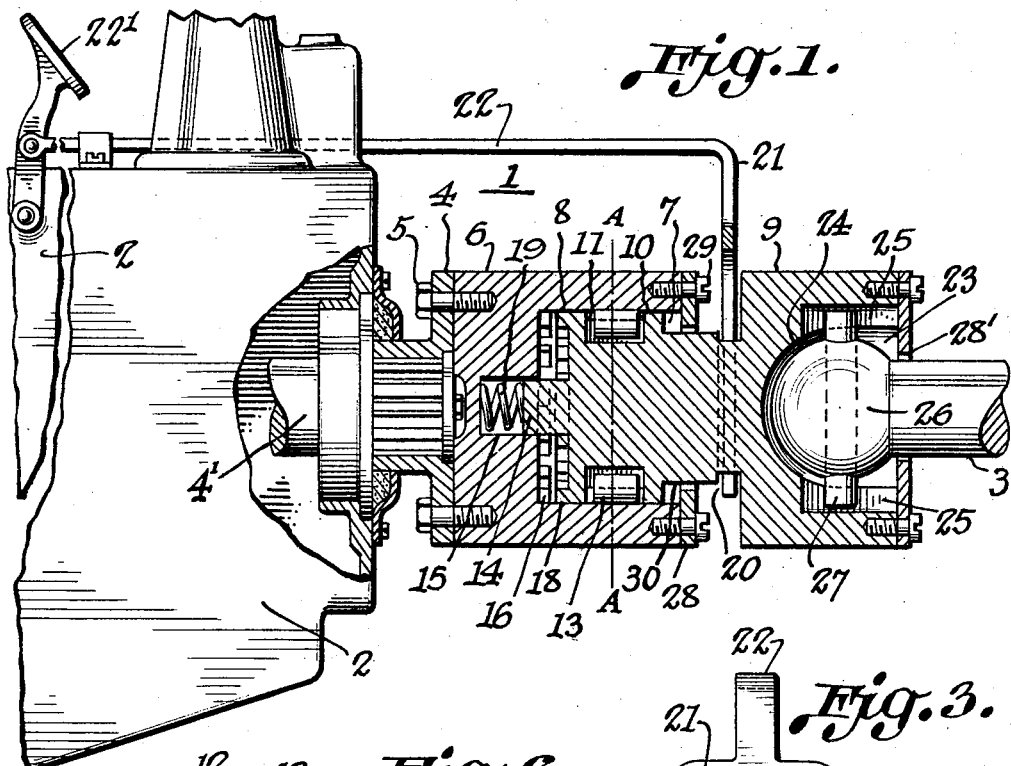
Figure 1 is a sectional view of one form of our invention.

Referring to the drawing in detail, the apparatus shown in Fig. 1 comprises a device 1 designed in accordance with our invention and associated with a transmission unit 2 and a driven shaft 3. Since the driven shaft of a modern vehicle terminates adjacent the transmission unit in a universal coupling, we find it convenient to insert between the transmission and propeller shaft a device designed in accordance with our invention.

Figure 2:
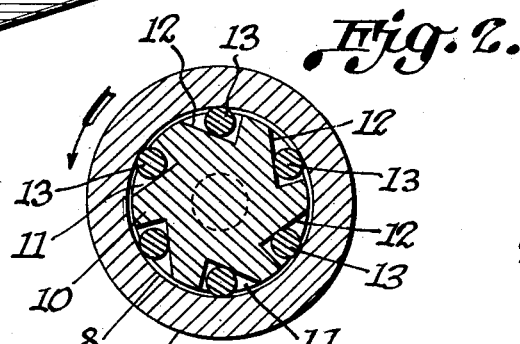
Fig. 2 is a sectional view taken along the line AA of Fig. 1.
Figure 3:
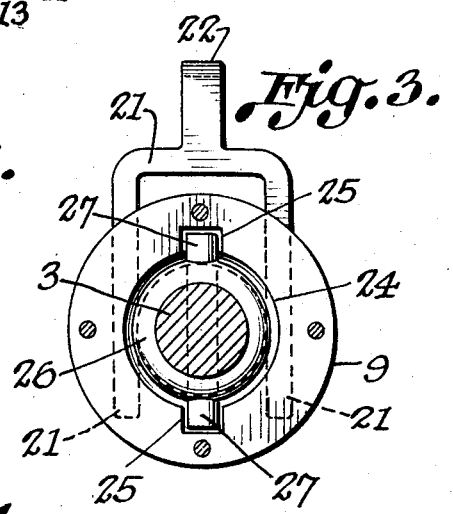
Fig. 3 is an end view of the apparatus shown in Fig. 1 with certain parts removed.
Figure 4:
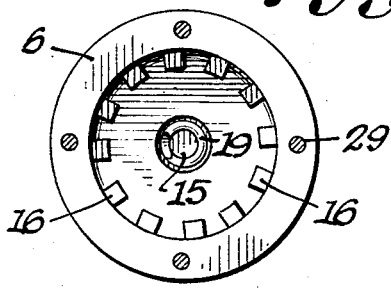
Fig. 4 is a detail end view of one member of the overrunning clutch.

A coupling plate 4, which is mounted on the shaft 4', and which heretofore has been coupled to a universal joint, is rigidly attached by any suitable means such as machine screws 5 to a cup-shaped member 6 provided with a recess 7 having a cylindrical inner surface 8. A second member 9 has a cylindrical portion 10 rotatably mounted within the recess 7 of the member 6. The periphery of this portion 10 is provided with a plurality of recesses 11 having surfaces 12 inclined with reference to the surface 8 as may be clearly seen upon reference to Fig. 2. Each of these recesses 11 contains a roller 13 which is adapted to roll up the inclined surface into forced engagement with the member 6 when the member rotates in the direction of the arrow with reference to the portion 10. The structure thus far described conforms to a well-known type of overrunning clutch.

Although the portion 10 may form a suitable bearing contact with the member 6, we provide an additional bearing member 14 rotatably mounted within a recess 15 formed in the member 6.

A suitable means is employed for locking the members 6 and 9 together, which, in the form illustrated, comprises a plurality of lugs 16 projecting from a surface of the member 6, and adapted to engage a plurality of lugs 18 affixed to the member 9. These sets of lugs are normally kept out of engagement by means of a spring 19, which is inserted in the recess 15, and which tends to separate the members 6 and 9. The lugs, therefore, serve to bring the members 6 and 9 in what may be termed a "jaw coupling" or "claw clutch" relation.

In order to move the sets of lugs into engagement, we provide a continuous circular groove 20 around the periphery of the member 9 and place therein a fork 21 associated with a control rod 22, which may be actuated by a foot lever 22' to force the sets of lugs into engagement without restricting rotation of the member 9.

The coupling between the shaft 3 and the device 1 is obtained by forming a cylindrical recess 23 in the member 9. The recess terminates in a spherical seat 24, and has a plurality of slots 25 extending into the member 9. This recess is designed to snugly and rotatably house a spherical member 26 affixed to the shaft 3. The member 26 is provided with a plurality of lugs 27, which may be formed by passing a pin through the member, and which extend into the slots 25. The members 9 and 26 constitute what is termed a ball and pin universal coupling, whereby rotation may be flexibly imparted by the member 9 to the shaft 3. From the above description, it is apparent that the lugs of the member 9 may be moved into engagement with the lugs 16 of the member 6 upon actuation of the rod 22 without causing withdrawal of the lugs 27 of the shaft 3 from the slots 25 of the member 9, sufficient slot length being provided for the resultant relative movement of the lugs 27.

If desired, a ring-shaped sealing member 28 may be attached by screws 29 to the member 6, and snugly but rotatably fitted around a cylindrical section 30 of the member 9 to exclude extraneous matter from the clutch mechanism, and to retain any lubricant required for the clutch mechanism. A similar sealing member 28' is provided on the rear end of the member 9, and may flex or otherwise accommodate said movement between the members 9 and 26.

The operation of the above described apparatus may be set forth as follows. During normal forward operation of the vehicle, the apparatus is in the position illustrated in Fig. 1. The member 6 is driven through the transmission unit by the vehicle's source of power, and as long as the speed of the member 6 tends to become greater than that of the member 9 in the direction of the arrow, the clutch mechanism is effective to transmit power between these members.

When the speed of the member 9 tends to increase above that of the member 6, which may occur when the vehicle descends a grade, the rollers of the clutch mechanism are driven down their respective inclines to disconnect the members 6 and 9, thereby permitting the member 9 to overrun the member 6.

Under conditions demanding a direct drive, such as those wherein the source of power is utilized to brake the vehicle, or wherein the direction of the vehicle is reversed, the rod 22 may be actuated to force the sets of lugs 16 and 18 into engagement, thereby securing direct drive. It should be noted that regardless of the position of the member 9, the universal joint members remain coupled.

From the foregoing description, it is apparent that our invention may be readily applied to the existing forms of vehicles without material alteration thereof. It is also clear that very few additional parts are required in the installation of a free wheeling device constructed according to our invention.

Although we have shown and described certain specific embodiments of our invention, we are fully aware that many modifications thereof are possible. Our invention, therefore, is not to be restricted except insofar as is necessitated by the prior art and by the scope of the appended claims.

What we claim is:—

1. A power-transmission apparatus comprising a driving member, a driven member for forming with said driving member a universal coupling, a clutch device associated with said coupling, and means responsive to relative movement between said members for converting said device into an overrunning clutch.

2. A power-transmission device comprising a driving member, a driven member, an element associated with one of said members for forming therewith a universal coupling, said element being movable substantially along its axis of rotation for a predetermined distance with reference to the associated member without loss of coupling, means for associating the element in overrunning clutch relation with the other of said members, and means reponsive to movement of the element along its axis of rotation for changing said overrunning clutch relation into a direct drive relation.

3. A power-transmission device comprising an overrunning clutch, a universal coupling associated therewith, the driving and driven members of the coupling being movable with reference to each other for a predetermined distance along the axis of rotation of one of the members, without loss of coupling, and means responsive to the relative movement of the members for locking the driving and driven members in direct drive.

4. A power-transmission device comprising a driving member, a driven member, an element universally coupled to one of said members, means cooperating with said element and the other of said members for forming therewith an overrunning clutch, and means responsive to movement of said element for preventing the relative rotation between said members normally allowed by the clutch.

5. In a power-transmission device, a jaw coupling comprising a driving and a driven member, a plurality of rollers cooperating with said members for forming therewith an overrunning clutch when the coupling is disengaged, and an element associated with one of said members for forming therewith a universal coupling, said element permitting axial movement of the associated member into or out of jaw engagement with the other of said members without loss of universal coupling.

6. A power transmission device for a motor vehicle comprising an overrunning clutch including a driving member and a driven member, a shaft terminating in a recess provided in one of the members, a pin cooperating with the shaft and recessed member for forming therewith a universal coupling, said recessed member being provided with elongated slots for receiving said pin and permitting a predetermined movement of the recessed member along its axis of rotation without loss of coupling, and a plurality of lugs on one of said members receivable in a plurality of corresponding recesses provided in the other of said members when the recessed member is axially moved for preventing relative rotation between the members.

In testimony whereof we affix our signatures.

EDGAR M. HIRSH.
JEROME H. D'ANDELET.